US011866040B2

(12) United States Patent
Uemura

(10) Patent No.: US 11,866,040 B2
(45) Date of Patent: Jan. 9, 2024

(54) MOVEMENT CONTROL SYSTEM, MOVEMENT CONTROL METHOD, PROGRAM AND MOVING BODY

(71) Applicant: Panasonic Intellectual Property Management Co., Ltd., Osaka (JP)

(72) Inventor: Takeshi Uemura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/004,812

(22) PCT Filed: Jul. 16, 2021

(86) PCT No.: PCT/JP2021/026857

§ 371 (c)(1),
(2) Date: Jan. 9, 2023

(87) PCT Pub. No.: WO2022/019240

PCT Pub. Date: Jan. 27, 2022

(65) Prior Publication Data

US 2023/0249681 A1 Aug. 10, 2023

(30) Foreign Application Priority Data

Jul. 21, 2020 (JP) ................................. 2020-124691

(51) Int. Cl.
*B60W 30/095* (2012.01)
*B60W 10/08* (2006.01)

(52) U.S. Cl.
CPC ........ *B60W 30/0956* (2013.01); *B60W 10/08* (2013.01); *B60W 2400/00* (2013.01);
(Continued)

(58) Field of Classification Search
CPC ............. B60W 30/0956; B60W 10/08; B60W 2756/10; B60W 2554/80; B60W 24/00; B60W 2420/42; B60W 2520/10
(Continued)

(56) References Cited

U.S. PATENT DOCUMENTS

2006/0220453 A1* 10/2006 Saito .................. B60W 10/184 303/152
2015/0239442 A1* 8/2015 Yamakado ........... B60W 10/08 701/70
(Continued)

FOREIGN PATENT DOCUMENTS

JP 2017-024637 A 2/2017
JP 2017-226371 A 12/2017
(Continued)

OTHER PUBLICATIONS

International Search Report dated Oct. 5, 2021 issued in International Patent Application No. PCT/JP2021/026857, with English translation.

*Primary Examiner* — Colby M Hansen
(74) *Attorney, Agent, or Firm* — Rimon P.C.

(57) ABSTRACT

A movement control system is a movement control system of a moving body configured to be moved by a driving system. The movement control system includes a planner, a corrector, and a controller. The planner is configured to execute an update process of updating a control plan of the driving system in accordance with reference information including first external environment information regarding an external environment of the moving body. The corrector is configured to execute, at a second timing between a plurality of first timings at each of which the update process is executed, a correction process of correcting the control plan in accordance with second external environment information regarding the external environment of the moving
(Continued)

20 40 30
DETECTION SYSTEM CONTROL SYSTEM DRIVING SYSTEM
FIRST EXTERNAL ENVIRONMENT INFORMATION
UPDATE PROCESS
CONTROL PLAN
SECOND EXTERNAL ENVIRONMENT INFORMATION
CONTROL
CORRECTION PROCESS
CORRECTED CONTROL PLAN
SECOND EXTERNAL ENVIRONMENT INFORMATION
CONTROL
CORRECTION PROCESS
CORRECTED CONTROL PLAN
FIRST EXTERNAL ENVIRONMENT INFORMATION
CONTROL
UPDATE PROCESS
CONTROL PLAN
SECOND EXTERNAL ENVIRONMENT INFORMATION
CONTROL
CORRECTION PROCESS
CORRECTED CONTROL PLAN
SECOND EXTERNAL ENVIRONMENT INFORMATION
CONTROL
CORRECTION PROCESS
CORRECTED CONTROL PLAN
FIRST EXTERNAL ENVIRONMENT INFORMATION
CONTROL
UPDATE PROCESS body. The second external environment information is different from the first external environment information. The controller is configured to control the driving system in accordance with the control plan.

19 Claims, 3 Drawing Sheets

(52) U.S. Cl.
CPC ..... *B60W 2420/42* (2013.01); *B60W 2520/10* (2013.01); *B60W 2554/80* (2020.02); *B60W 2756/10* (2020.02)

(58) Field of Classification Search
USPC ........................................................... 701/65
See application file for complete search history.

(56) References Cited

U.S. PATENT DOCUMENTS

| | | | |
|---|---|---|---|
| 2019/0111919 | A1 | 4/2019 | Matsunaga et al. |
| 2019/0324463 | A1 | 10/2019 | Zhu |
| 2020/0057447 | A1 | 2/2020 | Kato et al. |

FOREIGN PATENT DOCUMENTS

| | | | |
|---|---|---|---|
| JP | 2018-194343 | A | 12/2018 |
| JP | 2019-073039 | A | 5/2019 |
| JP | 2019-078656 | A | 5/2019 |
| JP | 2019-189214 | A | 10/2019 |
| WO | 2018/073887 | A1 | 4/2018 |

* cited by examiner

MOVEMENT CONTROL SYSTEM, MOVEMENT CONTROL METHOD, PROGRAM AND MOVING BODY

CROSS-REFERENCE OF RELATED APPLICATIONS

This application is the U.S. National Phase under 35 U.S.C. § 371 of International Patent Application No. PCT/JP2021/026857, filed on Jul. 16, 2021, which in turn claims the benefit of Japanese Patent Application No. 2020-124691, filed on Jul. 21, 2020, the entire disclosures of which Applications are incorporated by reference herein.

TECHNICAL FIELD

The present disclosure relates to a movement control system, a movement control method, a program, and an autonomously traveling moving body.

BACKGROUND ART

Patent Literature 1 discloses a vehicle control device (movement control system) for driving operations of vehicles. The vehicle control device of Patent Literature 1 includes an external environment recognition unit, a host vehicle position recognition unit, an action planning unit, and a vehicle control unit. The external environment recognition unit recognizes the circumstances and objects in the vicinity around a host vehicle. The host vehicle position recognition unit recognizes the position of the host vehicle and map information around the position thereof. The action planning unit determines a traveling state of the host vehicle and formulates (sets) behaviors of the host vehicle, on the basis of the recognition results of the external environment recognition unit and the host vehicle position recognition unit, and the detection results of vehicle sensors. Based on the determination results (setting results) of the action planning unit, the vehicle control unit calculates control command values with respect to an output device group.

In the vehicle control device of Patent Literature 1, if any event exerts influence on traveling of a vehicle after the behaviors are set by the action planning unit, the influence will not be addressed until the action planning unit next sets behaviors. This may contribute to a decrease in the stability of self-driving of the vehicle (autonomous travel of a moving body).

That is, conventional moving bodies have the problem that their autonomous travel is unstable.

CITATION LIST

Patent Literature

Patent Literature 1: JP 2019-73039 A

SUMMARY OF INVENTION

An object of the present invention is to provide a movement control system, a movement control method, a program, and a moving body which are capable of improving autonomous travel.

A movement control system of an aspect of the present disclosure is a movement control system of a moving body configured to be moved by a driving system and includes: a planner configured to execute an update process of updating a control plan of the driving system in accordance with reference information including first external environment information regarding an external environment of the moving body; a corrector configured to execute, at a second timing between a plurality of first timings at each of which the update process is executed, a correction process of correcting the control plan in accordance with second external environment information regarding the external environment of the moving body, the second external environment information being different from the first external environment information; and a controller configured to control the driving system in accordance with the control plan.

A movement control method of an aspect of the present disclosure includes: a planning step of executing an update process of updating a control plan of a driving system in accordance with reference information including first external environment information regarding an external environment of a moving body configured to be moved by the driving system; a correction step of executing, at a second timing between a plurality of first timings at each of which the update process is executed, a correction process of correcting the control plan in accordance with second external environment information regarding the external environment of the moving body, the second external environment information being different from the first external environment information; and a control step of controlling the driving system in accordance with the control plan.

A program of an aspect of a present disclosure is a program configured to cause one or more processors to execute the movement control method.

A moving body of an aspect of the present disclosure includes the movement control system and the driving system.

DESCRIPTION OF EMBODIMENTS

(1) Embodiment

(1-1) Overview

Figure 1:
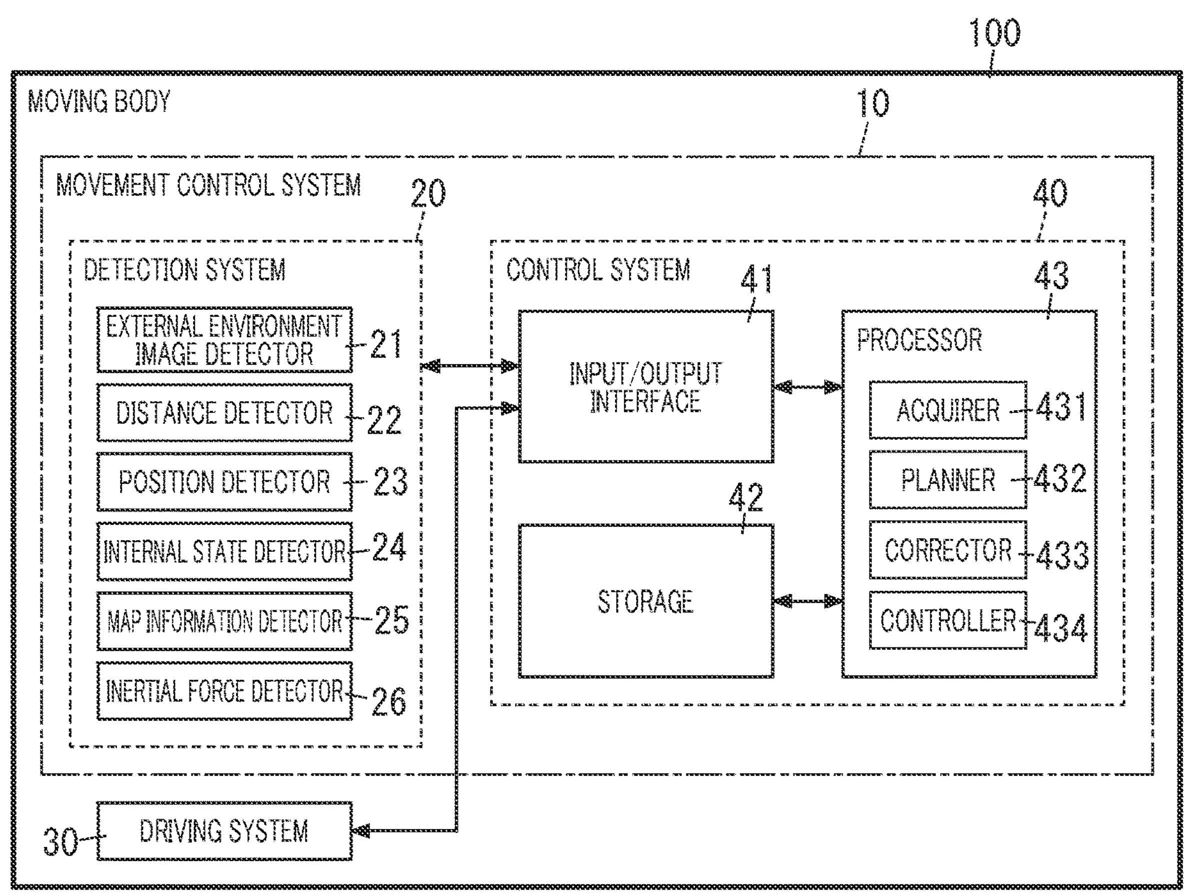
FIG. 1 is a block diagram of a moving body including a movement control system of an embodiment.

FIG. 1 shows a moving body 100 including a movement control system 10 of an embodiment. In the present embodiment, the moving body 100 is an automobile (see FIG. 3). In particular, the moving body 100 is an electric vehicle. The movement control system 10 is used for autonomous travel of the moving body 100. In the case of the moving body 100 being an automobile, the autonomous travel is also referred to as self-driving. That is, the movement control system 10 is used to move the moving body 100 without an operation given by a person.

The movement control system 10 includes a planner 432 and a corrector 433. The planner 432 executes, at predetermined intervals, an update process of updating a control plan of a driving system 30 in accordance with reference information. The reference information includes first external environment information regarding an external environment of the moving body 100 configured to be moved by the driving system 30. The corrector 433 executes, at a timing between a plurality of update processes, a correction process of correcting the control plan in accordance with second external environment information regarding the external environment of the moving body 100. The second external environment information is different from the first external environment information. In other words, the corrector 433 executes, at a second timing between a plurality of first timings at each of which the update process is executed, the correction process of correcting the control plan in accordance with the second external environment information regarding the external environment of the moving body 100. The second external environment information is different from the first external environment information. The external environment as used in the present disclosure means an environment around the moving body 100. Moreover, the first external environment information includes at least one of information obtained by detecting image information regarding the external environment of the moving body 100 by an external environment image detector 21 or information obtained by detecting distance information regarding a distance to a surrounding object in the external environment of the moving body 100 by a distance detector 22. Further, the second external environment information is information regarding the external environment of the moving body 100 and is obtained by detecting inertial force information by an inertial force detector 26. The inertial force information is information on an inertial force acting on the moving body 100 from the external environment of the moving body 100. Note that the second external environment information is not limited to the inertial force information but includes at least the inertial force information.

In the movement control system 10, the planner 432 updates the control plan of the driving system 30 of the moving body 100 in accordance with the reference information including the first external environment information, thereby enabling autonomous travel of the moving body 100. In addition, the movement control system 10 includes the corrector 433, and the corrector 433 corrects the control plan in accordance with the second external environment information between update processes (i.e., after an update process and before a next update process), thereby correcting the autonomous travel of the moving body 100. For example, any event (e.g., a change in a road surface condition) between the update processes may exert influence on the autonomous travel of the moving body 100, but the influence of the event on the autonomous travel can be alleviated by correcting the control plan by the corrector 433. This enables the moving body 100 to autonomously travel as planned. Thus, the movement control system 10 of the present embodiment enables the stability of the autonomous travel to be improved.

(1-2) Details

Figure 2:
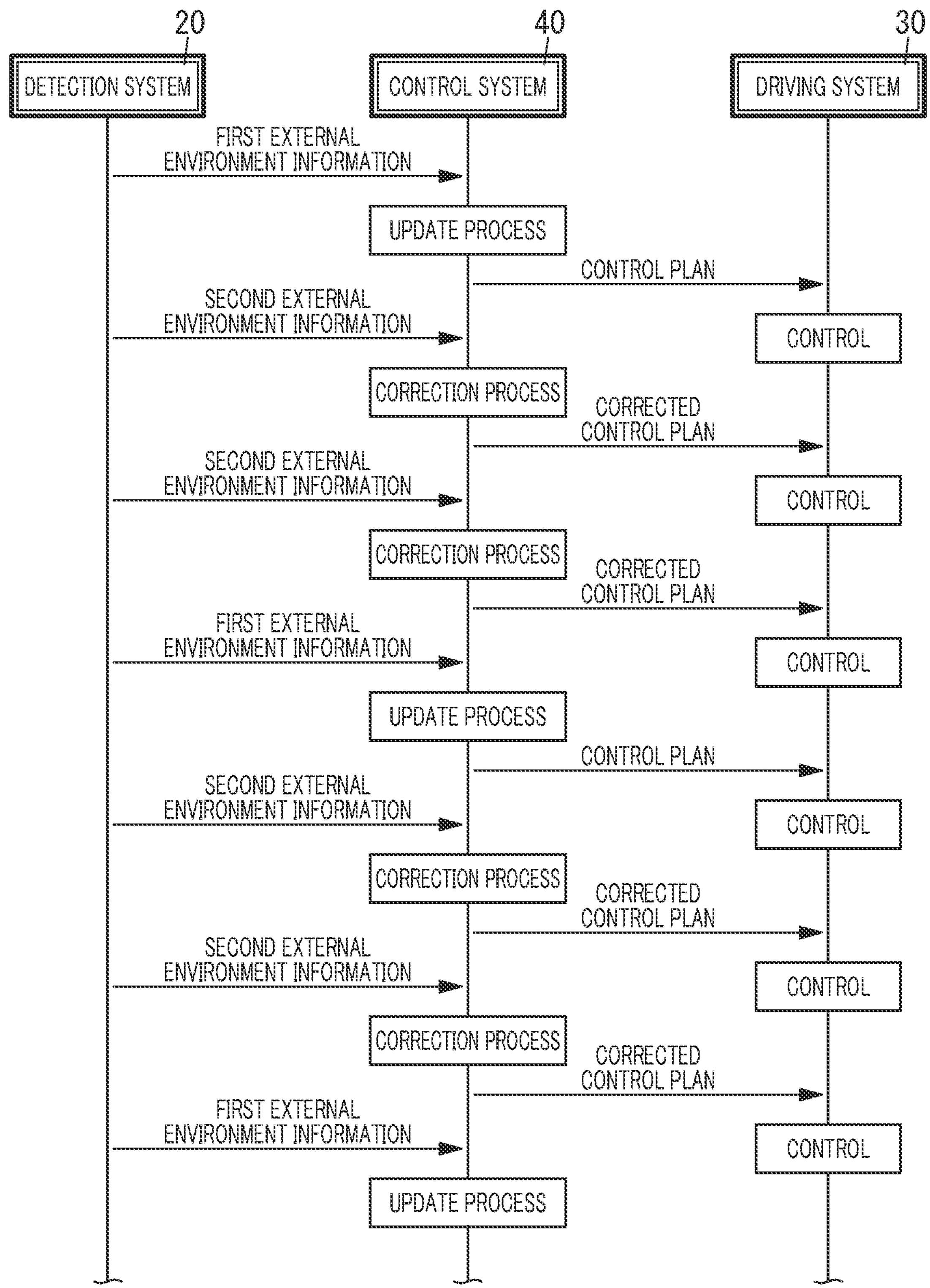
FIG. 2 is a sequence diagram of operation of the movement control system.
Figure 3:
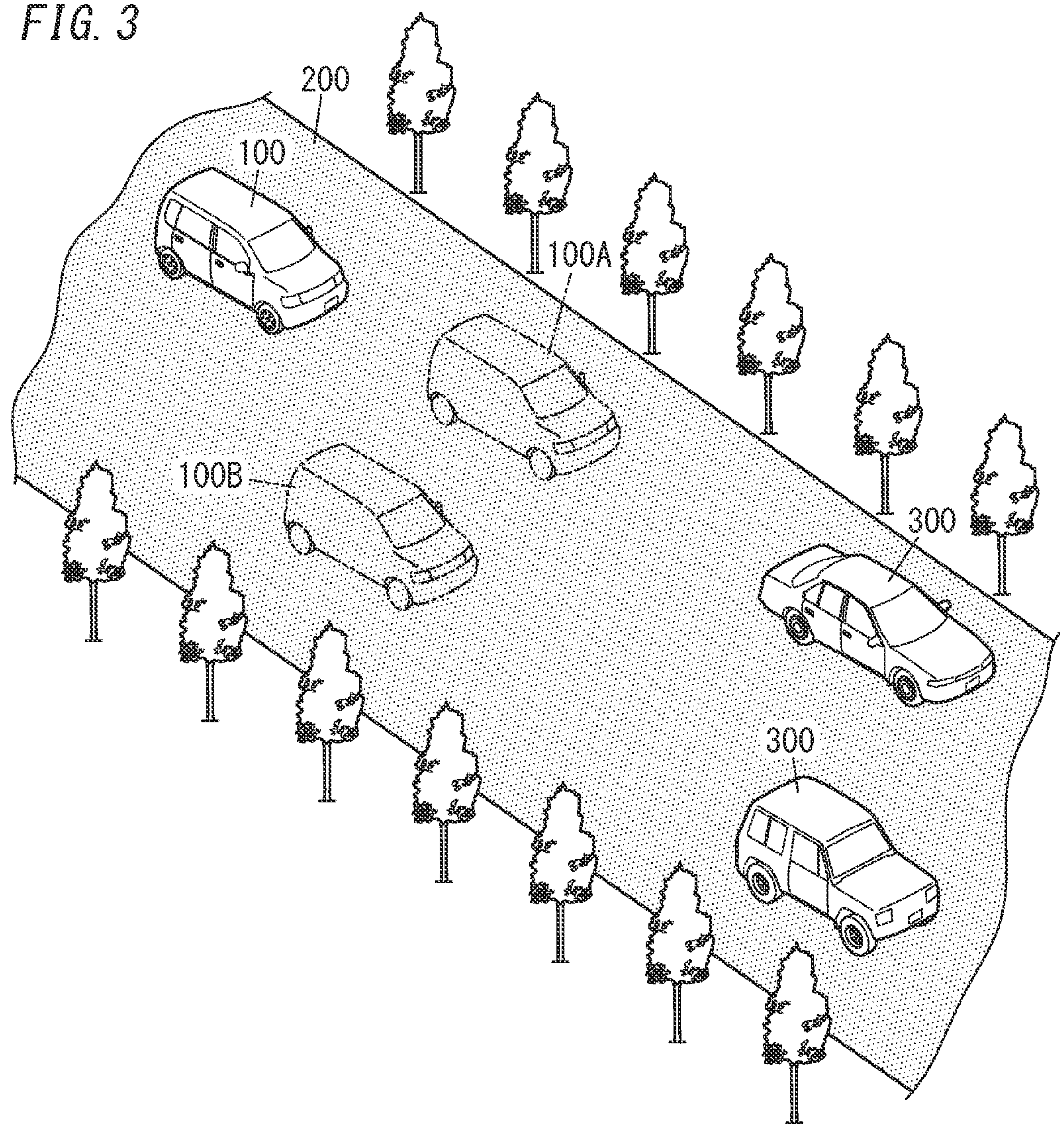
FIG. 3 is an illustrative view of the operation of the movement control system.

The movement control system 10 of the present embodiment will be described in further detail with reference to FIGS. 1 to 3.

As shown in FIG. 1, the movement control system 10 is disposed in the moving body 100 including the driving system 30.

The driving system 30 is a system for moving the moving body 100. In the present embodiment, the moving body 100 is an electric vehicle as described above, and the driving system 30 includes a power source (motor), drive wheels, a drive train (driving system components), and the like. The moving body 100 is caused to travel on land by the driving system 30.

The movement control system 10 includes a detection system 20 and a control system 40.

The detection system 20 is a system for detecting information regarding the moving body 100. The detection system 20 includes the external environment image detector 21, the distance detector 22, a position detector 23, an internal state detector 24, a map information detector 25, and the inertial force detector 26.

The external environment image detector 21 detects the image information regarding the external environment of the moving body 100. The image information includes information on one or more images (external environment images) concerning the external environment of the moving body 100. The image information includes an image of a forward view from the moving body 100, an image of a backward view from the moving body 100, an image of a rightward view from the moving body 100, and an image of a leftward view from the moving body 100. In the present embodiment, the external environment image detector 21 includes a plurality of image sensors, and the plurality of image sensors detect the image information. From the image information, the detection system 20 can detect the presence or absence of an object around the moving body 100 and the distance to the object.

The distance detector 22 detects the distance information on the distance to the object around the moving body 100. Here, the object is assumed to be an obstacle which obstructs movement of the moving body 100. That is, the obstacle is an object to be avoided by the moving body 100 when the moving body 100 moves. Examples of the obstacle include other moving bodies 300 as shown in FIG. 3. Other examples of the obstacle include people and fixtures (e.g., guardrails and fallen objects). The distance information includes the distance to an object in front of the moving body 100, the distance to an object behind the moving body 100, the distance to an object on the right of the moving body 100, and the distance to an object on the left of the moving body 100. The distance detector 22 includes a plurality of distance sensors, and the plurality of distance sensors detect the distance information. Examples of the distance sensor include ultrasonic sensors, RADAR devices, and LIDAR devices. Note that the distance information may also include information regarding the relative velocity to an object.

The position detector 23 detects location information of the moving body 100. The location information includes the present location of the moving body 100. The position detector 23 acquires the location information by a satellite positioning system. Examples of the satellite positioning system include the Global-Positioning System (GPS).

The internal state detector 24 detects internal information regarding an internal state of the moving body 100. The internal information includes a plurality of parameters indicating the internal state of the moving body 100. The internal state includes an operation state (control state) of the driving system 30. The operation state (control state) of the driving system 30 includes a steering angle, an amount of operation of an accelerator, an amount of operation of a brake, a speed, a state of a power source (an engine or a motor), a rotational speed of a transmission, a state of a control circuit (e.g., ECU) of the driving system 30, and a state of a control current in the driving system 30. The internal state detector 24 includes sensors and monitors for detecting the internal state. For example, the internal state detector 24 includes a steering angle sensor, an accelerator sensor, a brake sensor, a speedometer, a rotation sensor of an internal combustion engine or an electric motor, a rotation speed sensor of the transmission, a monitor of the control circuit, and a monitor of the control current.

The map information detector 25 detects map information regarding the moving body 100. The map information includes information regarding a map of a predetermined area including the surroundings of the moving body 100. The map information detector 25 extracts the map of the predetermined area including the surroundings of the moving body 100 from a map of a predetermined region in accordance with the location information of the position detector 23, thereby obtaining the map information. Note that the map information may be prepared in advance or may be provided by using landmark information or Simultaneous Localization and Mapping (SLAM) technology.

The inertial force detector 26 detects the inertial force information regarding the moving body 100. The inertial force information is information regarding an inertial force acting on the moving body 100. The inertial force is represented by an acceleration in the translationally accelerated system and is represented by an angular rate in the rotating coordinate system. That is, the detection of the inertial force means detection of at least one of the acceleration or the angular rate. The inertial force detector 26 includes a plurality of inertial sensors. Each inertial sensor is a sensor that detects at least one of the acceleration or the angular rate. In the present embodiment, the inertial force detector 26 detects inertial forces of three axes orthogonal to one another. The three axes orthogonal to one another are an axis in the forward/backward direction, an axis in the left/right direction, and an axis in the up/down direction of the moving body 100. In the present embodiment, the inertial force information includes angular rates and accelerations of the three axes.

The control system 40 includes an input/output interface 41, a storage 42, and a processor 43.

The input/output interface 41 is an interface for inputting information to the control system 40 and outputting information from the control system 40. That is, the input/output interface 41 also serves as an inputter via which information is input to the control system 40 and an output via which information is output from the control system 40. The information to the control system 40 includes information to be input from the detection system 20 to the control system 40. The information from the control system 40 includes information output from the control system 40 to the driving system 30. The input/output interface 41 may include an input device for operating the control system 40. The input device includes, for example, a touchpad and/or one or more buttons. In addition, the input/output interface 41 may include an image display device for displaying information. The image display device is a thin display device such as a liquid crystal display or an organic EL display. Note that the touchpad and the image display device of the input/output interface 41 may constitute a touch panel. In addition, the input/output interface 41 may include a communication interface and may be capable of inputting information to the control system 40 and outputting information from the control system 40 via wired communication or wireless communication. The communication protocol of the wired communication or the wireless communication may be selected from a variety of well-known wired and wireless communication standards.

The storage 42 is used to store information to be used by the processor 43. The storage 42 includes one or more storage devices. The storage devices are, for example, Random Access Memory (RAM) or Electrically Erasable Programmable Read Only Memory (EEPROM).

The processor 43 is a control circuit that controls the operation of the control system 40. The processor 43 may be embodied, for example, by a computer system including one or more processors (microprocessors) and one or more memory elements. The processor 43 includes an acquirer 431, the planner 432, the corrector 433, and a controller 434. In FIG. 1, the acquirer 431, the planner 432, the corrector 433, and the controller 434 do not represent tangible components but represents functions implemented by the processor 43.

The acquirer 431 acquires information from the detection system 20. More specifically, the information which the acquirer 431 acquires from the detection system 20 includes: the image information from the external environment image detector 21, the distance information from the distance detector 22, the location information from the position detector 23, the internal information from the internal state detector 24, the map information from the map information detector 25, and the inertial force information from the inertial force detector 26. The acquirer 431 acquires, not collectively, but individually at required timings, the image information, the distance information, the location information, the internal information, the map information, and the inertial force information. The present embodiment adopts an image sensor as the external environment image detector 21 in order to obtain the image information, a distance sensor as the distance detector 22 in order to obtain the distance information, and an inertial sensor as the inertial force detector 26 in order to obtain the inertial force information. In general, the inertial sensor updates information with a shorter cycle than each of the image sensor and the distance sensor. That is, the update frequency of information (the number of outputs per unit time) of the inertial sensor is higher than that of each of the image sensor and the distance sensor. For example, the update frequency of each of the image sensor and the distance sensor is 30 to 60, while the update frequency of the inertial sensor exceeds 100. The acquirer 431 acquires the inertial force information more frequently than the image information and the distance information. The acquirer 431 may acquire the location information, the internal information, and the map information at any timing. For example, the acquirer 431 may acquire the location information, the internal information, and the map information in response to a request from the planner 432 or the corrector 433.

The planner 432 regularly executes the update process. In the present embodiment, the planner 432 executes the update process every predetermined time length. The predetermined time length may correspond to the period of the update cycle of the first external environment information. The update process is a process of updating the control plan of the driving system 30 in accordance with the reference information. In the present embodiment, "updating the control plan" includes not only updating the control plan but also creating a new control plan. The control plan is information that defines the movement of the moving body 100 by the driving system 30. In the present embodiment, the control plan includes a target value of a travel trajectory of the moving body 100 (target travel trajectory) and a target value of the speed of the moving body 100 (target speed). Here, the speed of the moving body 100 may include speeds of the three axes in the forward/backward direction, the left/right direction, and the up/down direction. The reference information includes the first external environment information. The first external environment information is information regarding the external environment of the moving body 100 configured to be moved by the driving system 30. In the present embodiment, the first external environment information includes the image information on the external environment of the moving body 100 and the distance information on the distance to the object around the moving body 100. The planner 432 updates the control plan of the driving system 30 in accordance with the location information, the internal information, and the map information as needed in addition to the first external environment information (the image information and the distance information).

The corrector 433 executes the correction process of correcting the control plan in accordance with the second external environment information regarding the external environment of the moving body 100. The second external environment information is different from the first external environment information. In the present embodiment, the corrector 433 executes the correction process at a timing which is between the plurality of update processes and at which no update process is performed. The timing as used herein is a period which is from an update process to a next update process and during which no update process is performed. That is, the corrector 433 has a chance of performing the correction process at least once from the end of the update process to the start of the next update process. The second external environment information includes the inertial force information regarding an inertial force acting on the moving body 100 from the external environment. As described above, the inertial force information is acquired by the acquirer 431 more frequently than each of the image information and the distance information. Therefore, the corrector 433 can execute the correction process between the update processes. Thus, the cycle of the correction process is desirably shorter than the cycle of the update process.

The correction process will be described in further detail with reference to FIG. 3. The corrector 433 determines a predicted value of a moving state of the moving body 100 at a predetermined clock time in accordance with the second external environment information. The predicted value of the moving state of the moving body 100 at the predetermined clock time includes a predicted value of the travel trajectory of the moving body 100 (predicted travel trajectory) at the predetermined clock time and a predicted value of the speed (speeds of the three axes) of the moving body 100 (predicted speed) at the predetermined clock time. For example, in FIG. 3, a moving body 100B corresponds to the predicted values (the predicted travel trajectory and the predicted speed) of the moving state of the moving body 100 at the predetermined clock time. The second external environment information includes the inertial force information. From the inertial force, which is obtained from the inertial force information and which acts on the moving body 100, the corrector 433 can acquire a change in the movement of the moving body 100 (a change in the position of the moving body 100). Based on the change in the movement of the moving body 100, the corrector 433 determines the predicted value of the moving state of the moving body 100 at the predetermined clock time with reference to the location information, the internal information, and the map information as needed. The corrector 433 executes the correction process in accordance with the predicted value of the moving state of the moving body 100 at the predetermined clock time, the predicted value being obtained from the second external environment information. More specifically, the corrector 433 executes the correction process in accordance with the difference between the predicted value and the target value of the moving state of the moving body 100 at the predetermined clock time. The target value of the moving state of the moving body 100 at the predetermined clock time includes the target value of the travel trajectory of the moving body 100 (the target travel trajectory) and the target value of the speed (speeds of the three axes) of the moving body 100 (target speed) at the predetermined clock time. For example, in FIG. 3, a moving body 100A corresponds to the target values (the target travel trajectory and the target speed) of the moving state of the moving body 100 at the predetermined clock time. The corrector 433 executes the correction of the control plan such that the difference is zero. That is, in the present embodiment, the corrector 433 executes the correction of the control plan such that the predicted travel trajectory and the target travel trajectory at the predetermined clock time coincide with each other and the predicted speed and the target speed at the predetermined clock time coincide with each other. In this way, the control plan is corrected such that the moving body 100 is in the moving state indicated by the moving body 100A but not in the moving state indicated by the moving body 100B at the predetermined clock time. To correct the control plan, the location information, the internal information, and the map information are used as needed.

As described above, the corrector 433 corrects the autonomous travel of the moving body 100. For example, even when an unintended event (e.g., a change in a road surface condition) exerts influence on the autonomous travel of the moving body 100 between the update processes, the influence of the unintended event on the autonomous travel can be alleviated by correcting the control plan by the corrector 433. The unintended event can be an event which the update process of the control plan does not take into consideration. Examples of the unintended event may include changes in the environment, such as the road surface condition and the wind speed, around the moving body 100 or accidents (e.g., slipping and tire puncturing) of the moving body 100.

In the present embodiment, the corrector 433 does not execute the correction process while the speed of the moving body 100 is lower than or equal to a threshold. The threshold is not particularly limited but may be, for example, a speed corresponding to slow running in the case of an electric vehicle. This is because influence due to the occurrence of any event may be exerted on the movement of the moving body 100 but can be highly possibly addressed by the update process when the speed of the moving body 100 is low. This enables a processing load of the autonomous travel to be reduced. On the other hand, when the speed of the moving body 100 is higher than the threshold, the corrector 433 executes the correction process at the second timing between the plurality of first timings at each of which the update process is executed.

The controller 434 controls the driving system 30 in accordance with the control plan. The control plan can be a control plan resulting from the update process by the planner 432 or a control plan resulting from the correction process by the corrector 433. Therefore, when the planner 432 executes the update process, the controller 434 controls the driving system 30 in accordance with an updated control plan. When the corrector 433 executes the correction process, the controller 434 controls the driving system 30 in accordance with a corrected control plan until the planner 432 executes the update process. That is, when the control plan is corrected by the corrector 433, the controller 434 controls the driving system 30 in accordance with the corrected control plan. In the present embodiment, the controller 434 generates a control instruction in accordance with the target travel trajectory and the target vehicle speed included in the control plan or the corrected control plan and outputs the control instruction to the driving system 30. The control instruction includes an instruction value relating to the operation state (control state) of the driving system 30. For example, the control instruction may include a steering angle, an amount of operation of an accelerator, an amount of operation of a brake, a speed, a state of a power source (an engine or a motor), a rotational speed of a transmission, a control circuit (e.g., ECU) of the driving system 30, and a control current in the driving system 30.

(1-3) Operation

The operation of the movement control system 10 of the present embodiment will be described below with reference to the sequence diagram of FIG. 2.

In the movement control system 10, the detection system 20 gives the first external environment information (the image information and the distance information) to the control system 40. When acquiring the first external environment information, the control system 40 executes the update process to update the control plan. The control plan thus updated is given from the control system 40 to the driving system 30, and the driving system 30 moves the moving body 100 in accordance with the control plan. That is, the driving system 30 controls the moving body 100 in accordance with the control plan.

Since the update cycle of the second external environment information is shorter than the update cycle of the first external environment information, the detection system 20 then gives the second external environment information to the control system 40 before giving the first external environment information to the control system 40. When acquiring the second external environment information, the control system 40 executes the correction process to correct the control plan. The control plan thus corrected ("corrected control plan" in FIG. 2) is given from the control system 40 to the driving system 30, and the driving system 30 moves the moving body 100 in accordance with the corrected control plan. That is, the driving system 30 controls the moving body 100 in accordance with the corrected control plan.

When the second external environment information is further updated before the first external environment information is updated, the detection system 20 further gives the second external environment information to the control system 40. When acquiring the second external environment information, the control system 40 executes the correction process to correct the control plan. In other words, when acquiring the second external environment information, the control system 40 corrects the control plan previously corrected (corrected control plan). The control plan thus corrected is given from the control system 40 to the driving system 30, and the driving system 30 moves the moving body 100 in accordance with the control plan thus corrected.

Then, when the first external environment information is updated, the first external environment information is given from the detection system 20 to the control system 40. When acquiring the first external environment information, the control system 40 executes the update process to update the control plan. The control plan thus updated is given from the control system 40 to the driving system 30, and the driving system 30 moves the moving body 100 in accordance with the control plan.

As described above, the movement control system 10 executes a planning step of regularly executing the update process and a correction step of executing the correction process between the update processes, thereby realizing stable autonomous travel of the moving body 100.

(1-4) Summary

As described above, the movement control system 10 is a movement control system of the moving body 100 configured to be moved by the driving system 30 and includes the planner 432, the corrector 433, and the controller 434. The planner 432 executes the update process of updating the control plan of the driving system 30 in accordance with the reference information. The reference information includes the first external environment information regarding the external environment of the moving body 100. The corrector 433 executes, at a timing between the update processes, the correction process of correcting the control plan in accordance with the second external environment information regarding the external environment of the moving body 100. The second external environment information is different from the first external environment information. The controller 434 controls the driving system 30 in accordance with the control plan. The movement control system 10 of the present embodiment enables the stability of the autonomous travel to be improved.

In other words, it can be said that the movement control system 10 executes the following method (movement control method). The movement control method includes the planning step, the correction step, and a control step. The planning step is a step of regularly executing an update process of updating a control plan of the driving system 30 in accordance with reference information. The reference information includes first external environment information regarding an external environment of the moving body 100 configured to be moved by the driving system 30. The correction step is a step of executing, at a timing between the update processes, the correction process of correcting the control plan in accordance with the second external environment information regarding the external environment of the moving body 100. The second external environment information is different from the first external environment information. The control step is a step of controlling the driving system 30 in accordance with the control plan. Therefore, the movement control method of the present embodiment enables the stability of autonomous travel to be improved as in the case of the movement control system 10.

The movement control system 10 is implemented by using a computer system. That is, the method (movement control method) executed by the movement control system 10 can be implemented by the computer system executing a program. The program is a computer program for causing one or more processors to execute the movement control method. Such a program enables the stability of autonomous travel to be improved as in the case of the movement control system 10.

(2) Variations

The embodiment of the present disclosure is not limited to the embodiment described above. Rather, the embodiment described above may be readily modified in various manners depending on a design choice or any other factor without departing from the scope of the present disclosure. Variations of the embodiment described above will be enumerated below. The variations described below are applicable accordingly in combination.

In a variation, the moving body 100 is not limited to an automobile. The moving body 100 may be an object having a function of moving in a space, for example, on land (snow), on water, under water, in air, and in a cosmic space. The moving body 100 does not have to be a ride but may include an unmanned vehicle. Examples of the moving body 100 include vehicles, marine vessels, aircrafts, spacecrafts, and playground equipment. The vehicles include automobiles, bicycles, tricycles, and railroad vehicles. The automobiles include gasoline vehicles, electric vehicles, hybrid vehicles, and plug-in hybrid vehicles. The aircrafts include passenger aircrafts and drones.

In a variation, the movement control system 10 includes the detection system 20. However, the detection system 20 does not necessarily have to be included in the movement control system 10. The detection system 20 may be provided as a system outside the movement control system 10.

In a variation, the detection system 20 does not necessarily have to include the position detector 23, the internal state detector 24, or the map information detector 25. The detection system 20 may include: at least one of the external environment image detector 21 or the distance detector 22; and the inertial force detector 26.

In a variation, the processor 43 in the control system 40 includes at least the planner 432 and the corrector 433. The acquirer 431 and the controller 434 are not essential components.

In a variation, the interval at which the planner 432 executes the update process is not necessarily constant, and the update process may be performed at a timing at which the first external environment information is obtained.

In a variation, the cycle of the correction process may be the same as the cycle of the update process. The cycle of the correction process is determined at least such that the correction process is executed between the update processes.

In a variation, the correction process does not necessarily have to use the predicted value and may determine a correction value for the control plan directly from the second external environment information. That is, the correction process may be a process of accordingly changing the control plan such that the moving body 100 moves in accordance with an original control plan.

In a variation, the first external environment information includes at least one of the external image information of the moving body 100 or the distance information on the distance to the object around the moving body 100.

In a variation, the reference information includes at least the first external environment information and does not necessarily have to include the location information, the internal information, or the map information.

In a variation, the reference information may include information regarding the second external environment information. That is, the second external environment information may be reflected in the control plan in the planner 432. The information regarding the second external environment information may be the second external environment information itself or may be information on the above-described difference. Reflecting the second external environment information in the control plan in the planner 432 can improve the accuracy of the control plan.

In a variation, the second external environment information may include information different from the inertial force information. However, the second external environment information is preferably information regarding the external environment of the moving body 100 and being different from the first external environment information. In addition, the update cycle of the second external environment information is preferably shorter than the update cycle of the first external environment information. For example, the second external environment information may include information, such as the speed and changes in the direction of the tire of the moving body 100, changes in the wind speed, and changes in the road surface, which may exert influence on the movement of the moving body 100.

In a variation, the corrector 433 may execute the correction process, irrespective of the speed of the moving body 100.

The movement control system 10 (the control system 40) of the present disclosure includes, for example, a computer system. The computer system includes a processor and memory as hardware as main components. The processor executes a program recorded in the memory of the computer system, thereby implementing the function as the movement control system 10 (the control system 40) of the present disclosure. The program may be stored in the memory of the computer system in advance, may be provided over a telecommunications network, or may be provided as a non-transitory recording medium such as a computer-system readable memory card, an optical disk, a hard disk drive, or the like storing the program. The processor of the computer system includes one or a plurality of electronic circuits including semiconductor integrated circuits (IC) or large-scale integrated circuits (LSI).The integrated circuit such as IC or LSI mentioned herein may be referred to in another way, depending on the degree of the integration and includes integrated circuits called system LSI, very-large-scale integration (VLSI), or ultra-large-scale integration (ULSI). A field-programmable gate array (FPGA), which is programmable after fabrication of the LSI, or a logical device which allows reconfiguration of connections in LSI or reconfiguration of circuit cells in LSI may be adopted as the processor. The plurality of electronic circuits may be collected on one chip or may be distributed on a plurality of chips. The plurality of chips may be collected in one device or may be distributed in a plurality of devices. As mentioned herein, the computer system includes a microcontroller including one or more processors and one or more memory elements. Thus, the microcontroller is also composed of one or more electronic circuits including a semiconductor integrated circuit or a large-scale integrated circuit.

Collecting a plurality of functions in the movement control system 10 (the control system 40) in a single housing is not an essential configuration of the movement control system 10 (the control system 40), and the components of the movement control system 10 (the control system 40) may be distributed in a plurality of housings. Still alternatively, at least some of the functions of the movement control system 10 (the control system 40), for example, some of the functions of the processor 43 may be implemented as a cloud (cloud computing) system as well.

(3) Aspects

As can be seen from the embodiment and the variations described above, the present disclosure includes the following aspects. In the following description, reference signs in parentheses are added only to clarify the correspondence relationship to the embodiment.

A first aspect is a movement control system (10) of a moving body (100) configured to be moved by a driving system (30). The movement control system (10) includes a planner (432), a corrector (433), and a controller (434). The planner (432) is configured to execute an update process of updating a control plan of the driving system (30) in accordance with reference information including first external environment information regarding an external environment of the moving body (100). The corrector (433) is configured to execute, at a second timing between a plurality of first timings at each of which the update process is executed, a correction process of correcting the control plan in accordance with second external environment information regarding the external environment of the moving body (100). The second external environment information is different from the first external environment information. The controller (434) is configured to control the driving system (30) in accordance with the control plan. This aspect enables the stability of autonomous travel to be improved.

A second aspect is a movement control system (10) based on the first aspect. In the second aspect, the first external environment information is information including at least one of image information regarding the external environment of the moving body (100) or distance information regarding a distance to an object around the moving body (100). The second external environment information is information including inertial force information regarding an inertial force acting on the moving body (100) from the external environment of the moving body (100). This aspect enables the accuracy of correction of the control plan to be improved.

A third aspect is a movement control system (10) based on the first or second aspect. In the third aspect, the controller (434) is configured to, when the corrector (433) executes the correction process, control the driving system (30) in accordance with a corrected control plan until the planner (432) executes the update process. This aspect enables the stability of autonomous travel to be improved.

A fourth aspect is a movement control system (10) based on any one of the first to third aspects. In the fourth aspect, the corrector (433) is configured to execute the correction process in accordance with a difference between a predicted value of a moving state of the moving body (100) at a predetermined clock time and a target value of the moving state of the moving body (100) at the predetermined clock time. The predicted value is obtained from the second external environment information. This aspect enables the accuracy of correction of the control plan to be improved.

A fifth aspect is a movement control system (10) based on the fourth aspect. In the fifth aspect, the reference information includes information on the difference. This aspect enables the accuracy of the control plan to be improved.

A sixth aspect is a movement control system (10) based on any one of the first to fifth aspects. In the sixth aspect, the reference information includes the second external environment information. This aspect enables the accuracy of the control plan to be improved.

A seventh aspect is a movement control system (10) based on any one of the first to sixth aspects. In the seventh aspect, a cycle of the correction process is shorter than a cycle of the update process. This aspect enables the frequency of correction of the control plan to be increased.

An eighth aspect is a movement control system (10) based on any one of the first to seventh aspects. In the eighth aspect, an update cycle of the second external environment information is shorter than an update cycle of the first external environment information. This aspect enables the frequency of correction of the control plan to be increased.

A ninth aspect is a movement control system (10) based on any one of the first to eighth aspects. In the ninth aspect, the corrector (433) is configured to forgo execution of the correction process while a speed of the moving body (100) is lower than or equal to a threshold. This aspect enables a processing load of the autonomous travel to be reduced.

A tenth aspect is a movement control method including a planning step, a correction step, and a control step. The planning step is a step of executing an update process of updating a control plan of a driving system (30) in accordance with reference information including first external environment information regarding an external environment of a moving body (100) configured to be moved by the driving system (30). The correction step is a step of executing, at a second timing between a plurality of first timings at each of which the update process is executed, a correction process of correcting the control plan in accordance with second external environment information regarding the external environment of the moving body (100). The second external environment information is different from the first external environment information. The control step is a step of controlling the driving system (30) in accordance with the control plan. This aspect enables the stability of autonomous travel to be improved.

An eleventh aspect is a program (computer program) configured to cause one or more processors to execute the movement control method of the tenth aspect. This aspect enables the stability of autonomous travel to be improved.

A twelfth aspect is a moving body (100). The moving body (100) includes: the movement control system (10) of any one of the first to ninth aspects; and the driving system (30). This aspect enables the stability of autonomous travel to be improved.

Note that the second to ninth aspects may be appropriately modified and applied to the tenth aspect as well.

REFERENCE SIGNS LIST

100 Moving Body
10 Movement Control System
30 Driving System
432 Planner
433 Corrector
434 Controller

The invention claimed is:

1. A movement control system of a moving body configured to be moved by a driving system, the movement control system comprising:

a planner configured to execute an update process of updating a control plan of the driving system in accordance with reference information including first external environment information regarding an external environment of the moving body;

a corrector configured to execute, at a second timing between a plurality of first timings at each of which the update process is executed, a correction process of correcting the control plan in accordance with second external environment information regarding the external environment of the moving body, the second external environment information being different from the first external environment information; and a controller configured to control the driving system in accordance with the control plan.

2. The movement control system of claim 1, wherein the first external environment information is information including at least one of image information regarding the external environment of the moving body or distance information regarding a distance to an object around the moving body, and the second external environment information is information including inertial force information regarding an inertial force acting on the moving body from the external environment of the moving body.

3. The movement control system of claim 2, wherein the controller is configured to, when the corrector executes the correction process, control the driving system in accordance with a corrected control plan until the planner executes the update process.

4. The movement control system of claim 2, wherein the corrector is configured to execute the correction process in accordance with a difference between a predicted value of a moving state of the moving body at a predetermined clock time and a target value of the moving state of the moving body at the predetermined clock time, the predicted value being obtained from the second external environment information.

5. The movement control system of claim 2, wherein the reference information includes the second external environment information.

6. A moving body comprising:

the movement control system of claim 1; and the driving system.

7. The movement control system of claim 2, wherein the corrector is configured to forgo execution of the correction process while a speed of the moving body is lower than or equal to a threshold.

8. The movement control system of claim 1, wherein the controller is configured to, when the corrector executes the correction process, control the driving system in accordance with a corrected control plan until the planner executes the update process.

9. The movement control system of claim 8, wherein the corrector is configured to execute the correction process in accordance with a difference between a predicted value of a moving state of the moving body at a predetermined clock time and a target value of the moving state of the moving body at the predetermined clock time, the predicted value being obtained from the second external environment information.

10. The movement control system of claim 1, wherein the corrector is configured to execute the correction process in accordance with a difference between a predicted value of a moving state of the moving body at a predetermined clock time and a target value of the moving state of the moving body at the predetermined clock time, the predicted value being obtained from the second external environment information.

11. The movement control system of claim 10, wherein the reference information includes information on the difference.

12. The movement control system of claim 1, wherein the reference information includes the second external environment information.

13. The movement control system of claim 1, wherein a cycle of the correction process is shorter than a cycle of the update process.

14. The movement control system of claim 1, wherein an update cycle of the second external environment information is shorter than an update cycle of the first external environment information.

15. The movement control system of claim 1, wherein the corrector is configured to forgo execution of the correction process while a speed of the moving body is lower than or equal to a threshold.

16. The movement control system of claim 2, wherein a cycle of the correction process is shorter than a cycle of the update process.

17. The movement control system of claim 1, wherein an update cycle of the second external environment information is shorter than an update cycle of the first external environment information.

18. A movement control method comprising:

a planning step of executing an update process of updating a control plan of a driving system in accordance with reference information including first external environment information regarding an external environment of a moving body configured to be moved by the driving system;

a correction step of executing, at a second timing between a plurality of first timings at each of which the update process is executed, a correction process of correcting the control plan in accordance with second external environment information regarding the external environment of the moving body, the second external environment information being different from the first external environment information; and a control step of controlling the driving system in accordance with the control plan.

19. A non-transitory computer-readable recording medium storing a program configured to cause one or more processors to execute the movement control method of claim 18.

* * * * *